US012748053B2

(12) United States Patent
Kim et al.

(10) Patent No.: US 12,748,053 B2
(45) Date of Patent: Sep. 29, 2026

(54) INSPECTION DEVICE AND METHOD OF INSPECTING INSPECTION TARGET USING THE SAME

(71) Applicant: Samsung Display Co., LTD., Yongin-si (KR)

(72) Inventors: Myoungchul Kim, Yongin-si (KR); Tae-Gu Kang, Yongin-si (KR); Byoung-Ju Kim, Yongin-si (KR); Hyojin Kim, Yongin-si (KR); Seungbum Park, Yongin-si (KR); Jihoon Seo, Yongin-si (KR); Tae-Jun Ahn, Yongin-si (KR); Sangsu Lee, Yongin-si (KR); Hyoyul Lee, Yongin-si (KR); Jeonghwa Ha, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 565 days.

(21) Appl. No.: 18/203,992

(22) Filed: May 31, 2023

(65) Prior Publication Data

US 2024/0060903 A1 Feb. 22, 2024

(30) Foreign Application Priority Data

Aug. 19, 2022 (KR) ........................ 10-2022-0104322

(51) Int. Cl.
*G06K 9/00* (2022.01)
*G01N 21/88* (2006.01)
(Continued)

(52) U.S. Cl.
CPC ....... *G01N 21/8851* (2013.01); *G06T 7/0006* (2013.01); *G06V 10/60* (2022.01); *G01N 2021/8887* (2013.01)

(58) Field of Classification Search
CPC ....... G01N 2021/8887; G01N 21/8851; G01N 21/95; G06T 2207/10024;
(Continued)

(56) References Cited

U.S. PATENT DOCUMENTS 6,241,288 B1 * 6/2001 Bergenek ........... G06V 40/1365 283/67
6,947,587 B1 * 9/2005 Maeda .................... G06T 7/001 382/149
(Continued)

FOREIGN PATENT DOCUMENTS

JP 5466264 B2 4/2014
KR 100814410 B1 3/2008
(Continued)

*Primary Examiner* — Avinash Yentrapati
(74) *Attorney, Agent, or Firm* — CANTOR COLBURN LLP

(57) ABSTRACT

An inspection device includes an imaging unit which captures an inspection target and outputs image data corresponding to the inspection target, a data extraction unit which receives the image data and extracts inspection data corresponding to an inspection area of the inspection target from the image data, a setting unit which sets a threshold value based on a grayscale value of comparative data compared with the inspection data, and an inspection unit which determines whether the inspection target is defective based on the threshold value.

11 Claims, 10 Drawing Sheets

(51) Int. Cl.
*G06T 7/00* (2017.01)
*G06V 10/60* (2022.01)

(58) Field of Classification Search
CPC . G06T 2207/20224; G06T 2207/30121; G06T 7/0006; G06T 7/0008; G06T 7/001; G06V 10/60; G06V 2201/06
See application file for complete search history.

(56) References Cited

U.S. PATENT DOCUMENTS 8,055,057 B2 11/2011 Kang et al.
2003/0228050 A1* 12/2003 Geshel .................... G06T 7/001 382/149
2007/0071307 A1* 3/2007 Isomura .................. G06T 7/001 382/149
2008/0152225 A1* 6/2008 Iwamoto .............. G06V 10/758 382/190
2008/0172196 A1* 7/2008 Kang ............... G01N 21/95607 702/81
2011/0170765 A1* 7/2011 Maeda .................. G06T 7/0004 382/145
2011/0274342 A1* 11/2011 Maeda .................... H10P 74/23 382/149
2012/0189171 A1* 7/2012 Abiko ................ G06V 40/1359 382/115
2016/0125590 A1* 5/2016 Yoshida ................ G06T 7/0004 348/87
2018/0261424 A1* 9/2018 Tsuchiya ................. H01J 37/28
2020/0034511 A1* 1/2020 Dutta .................... G03F 7/7065
2020/0150052 A1* 5/2020 Lee .................... G01N 21/8903
2022/0114714 A1* 4/2022 Song ......................... G06T 7/11
2022/0139113 A1* 5/2022 Kim ....................... G06V 10/50 382/103
2022/0189426 A1* 6/2022 Chen .................... G09G 3/3607
2023/0267598 A1* 8/2023 Siman tov .............. G06T 7/001 382/141
2023/0281784 A1* 9/2023 Wang ..................... G06V 10/22 382/141
2025/0044710 A1* 2/2025 Fu ..................... G03F 7/706835
2025/0104210 A1* 3/2025 Pu .......................... G06N 3/084
2025/0182443 A1* 6/2025 Fu ........................ G06V 10/761

FOREIGN PATENT DOCUMENTS

KR 101665168 B1 10/2016
KR 1020210152075 A 12/2021

* cited by examiner

Th-G1:CG-G1 = PV1
Th-G2:CG-G2 = PV2
Th-G3:CG-G3 = PV3

INSPECTION DEVICE AND METHOD OF INSPECTING INSPECTION TARGET USING THE SAME

This application claims priority to Korean Patent Application No. 10-2022-0104322, filed on Aug. 19, 2022, and all the benefits accruing therefrom under 35 U.S.C. § 119, the content of which in its entirety is herein incorporated by reference.

BACKGROUND

1. Field

The disclosure relates to an inspection device with improved reliability of defect determination and a method of inspecting a display device using the inspection device.

2. Description of the Related Art

Various inspection devices are used to inspect a display device. Among the inspection devices, an optical inspection device inspects the display device using a camera. The optical inspection device inspects the display device for a short-circuit defect, an open-circuit defect, or a presence of fine particles in units of several micrometers to several tens of micrometers, for example. In addition, the optical inspection device inspects the display device for foreign substances or residual films of about several hundred micrometers or more.

SUMMARY

The disclosure provides an inspection device with improved reliability of defect determination.

The disclosure provides a method of inspecting a display device using the inspection device.

An embodiment of the inventive concept provides an inspection device including an imaging unit which captures an inspection target and outputs image data corresponding to the inspection target, a data extraction unit which receives the image data and extracts inspection data corresponding to an inspection area of the inspection target from the image data, a setting unit which sets a threshold value based on a grayscale value of comparative data compared with the inspection data, and an inspection unit which determines whether the inspection target is defective based on the threshold value.

In an embodiment, the setting unit sets the threshold value to increase as the grayscale value of the comparative data increases.

In an embodiment, the grayscale value of the comparative data has a range including a first section, a second section, and a third section.

In an embodiment, the setting unit sets the grayscale value of the comparative data and the threshold value such that an increase amount of the grayscale value of the comparative data is directly proportional to an increase amount of the threshold value in each of the first section, the second section, and the third section.

In an embodiment, a relationship between the increase amount of the grayscale value of the comparative data and the increase amount of the threshold value in the first section is defined as a first proportional value, a relationship between the increase amount of the grayscale value of the comparative data and the increase amount of the threshold value in the second section is defined as a second proportional value, a relationship between the increase amount of the grayscale value of the comparative data and the increase amount of the threshold value in the third section is defined as a third proportional value, the third proportional value is set greater than the second proportional value by the setting unit, and the second proportional value is set greater than the first proportional value by the setting unit.

In an embodiment, the setting unit sets the threshold value to which a first correction value is applied in the first section, sets the threshold value to which a second correction value is applied in the second section, and sets the threshold value to which a third correction value is applied in the third section.

In an embodiment, a reference grayscale value is defined in a range of the grayscale value of the comparative data, and the inspection unit does not determine whether the inspection target is defective in a section where the grayscale value is greater than the reference grayscale value.

In an embodiment, the inspection area includes a first inspection area and a second inspection area, the data extraction unit extracts first inspection data corresponding to the first inspection area and second inspection data corresponding to the second inspection area, and the inspection unit determines whether the first and second inspection data are defective based on different threshold values from each other.

In an embodiment, the comparative data correspond to a comparative area from the image data to be compared with the inspection area.

In an embodiment, the inspection target includes a plurality of cells.

In an embodiment, the inspection target includes a plurality of layers, and the inspection area and the comparative area are defined in a same layer.

In an embodiment, the inspection device further includes a light source which irradiates a light and an optical member which controls a path of the light to direct toward the inspection target.

An embodiment of the inventive concept provides a method of inspecting an inspection target. The inspection method includes capturing, by an imaging unit, the inspection target and to output image data, receiving, by a data extraction unit, the image data and to extract inspection data from the image data, setting, by a setting unit, a threshold value based on a grayscale value of comparative data, and comparing the inspection data with the comparative data to determine whether the inspection target is defective based on the threshold value.

In an embodiment, the extracting the inspection data and the comparative data includes setting an inspection area and a comparative area.

In an embodiment, an increase amount of the grayscale value of the comparative data and an increase amount of the threshold value have a linear relationship.

In an embodiment, the grayscale value of the comparative data has a range including a first section, a second section, and a third section, the grayscale value of the comparative data and the threshold value have a first linear relationship in the first section, the grayscale value of the comparative data and the threshold value have a second linear relationship in the second section, and the grayscale value of the comparative data and the threshold value have a third linear relationship in the third section.

In an embodiment, the third linear relationship has a slope greater than a slope of the second linear relationship, and the second linear relationship has the slope greater than a slope of the first linear relationship.

In an embodiment, the method further includes providing the inspection target and irradiating a light to the inspection target using a light source.

In an embodiment, the irradiating the light to the inspection target includes controlling a path of the light toward the inspection target using an optical member.

In an embodiment, the inspection target has a multi-layer structure including a metal layer, and the outputting the image data by the imaging unit includes capturing the metal layer and outputting the image data.

According to the above, the inspection device determines whether the display panel is defective by comparing the image taken from the inspection area with the image taken from the comparative area. The threshold value is set to differ depending on the grayscale value of the comparative area in order to determine whether the inspection area is defective. In detail, the threshold value is set to have a lower value in a section where the grayscale value of the comparative area is relatively low to further detect whether the inspection area is defective, and the threshold value is set to have a higher value in a section where the grayscale value of the comparative area is relatively high to prevent errors in detecting defects. Accordingly, the reliability of defect detection of the inspection device is improved, and a yield of products inspected by the inspection device increases.

BRIEF DESCRIPTION OF THE DRAWINGS

The above and other advantages of the disclosure will become readily apparent by reference to the following detailed description when considered in conjunction with the accompanying drawings, in which.

DETAILED DESCRIPTION

Figure 1:
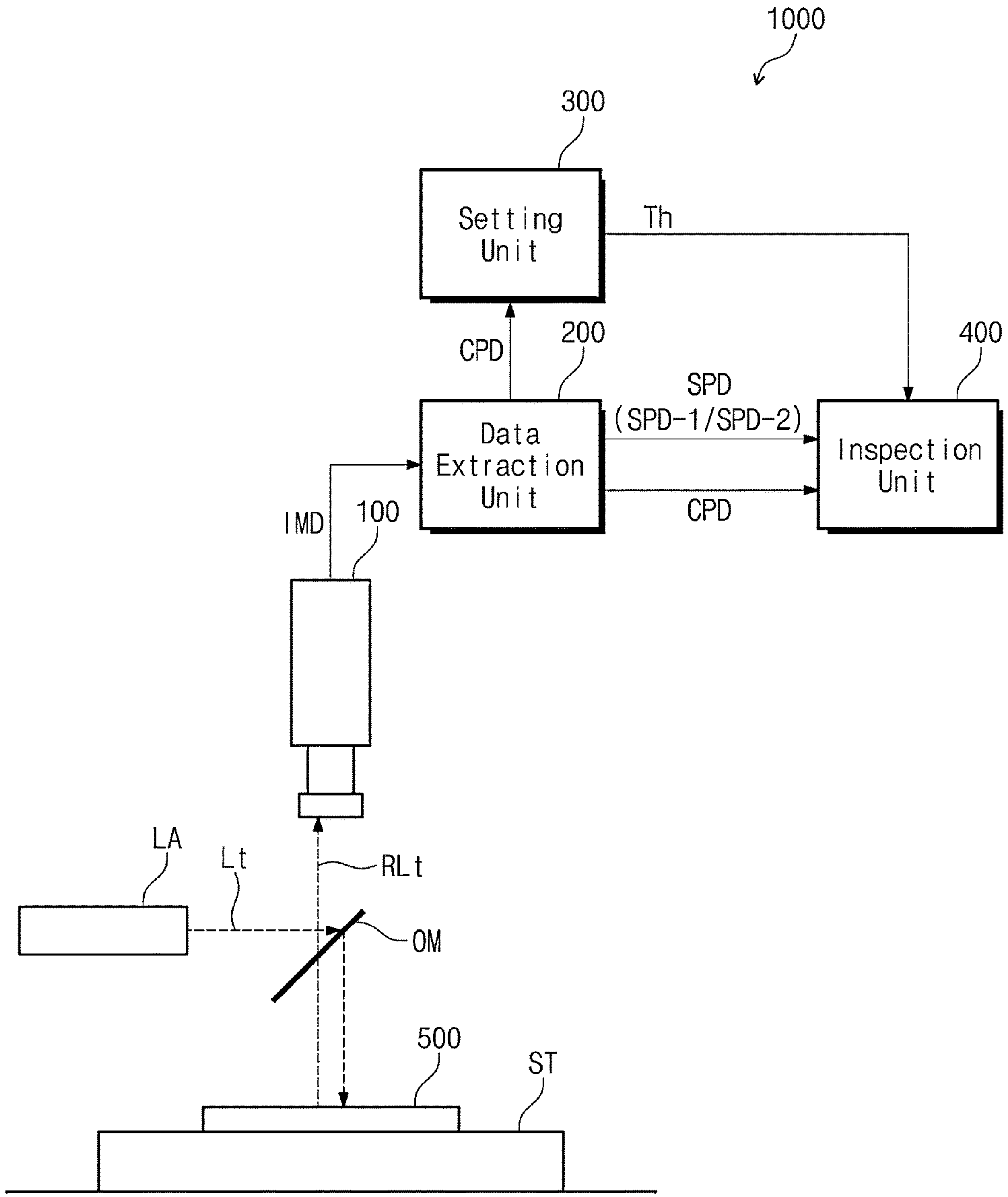
FIG. 1 is a block diagram of an embodiment of an inspection device according to the disclosure.

The disclosure may be variously modified and realized in many different forms, and thus illustrative embodiments will be exemplified in the drawings and described in detail hereinbelow. However, the disclosure should not be limited to the specific disclosed forms, and be construed to include all modifications, equivalents, or replacements included in the spirit and scope of the disclosure.

In the disclosure, it will be understood that when an element (or area, layer, or portion) is referred to as being "on", "connected to" or "coupled to" another element or layer, it may be directly on, connected or coupled to the other element or layer or intervening elements or layers may be present.

Like numerals refer to like elements throughout. In the drawings, the thickness, ratio, and dimension of components are exaggerated for effective description of the technical content.

As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the drawing figures.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

The term "unit" as used herein is intended to mean a software component or a hardware component that performs a predetermined function. The hardware component may include a field-programmable gate array ("FPGA") or an application-specific integrated circuit ("ASIC"), for example. The software component may refer to an executable code and/or data used by the executable code in an addressable storage medium. Thus, the software components may be object-oriented software components, class components, and task components, and may include processes, functions, attributes, procedures, subroutines, segments of program code, drivers, firmware, micro codes, circuits, data, a database, data structures, tables, arrays, or variables, for example.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the disclosure will be described with reference to accompanying drawings.

Figure 2A:
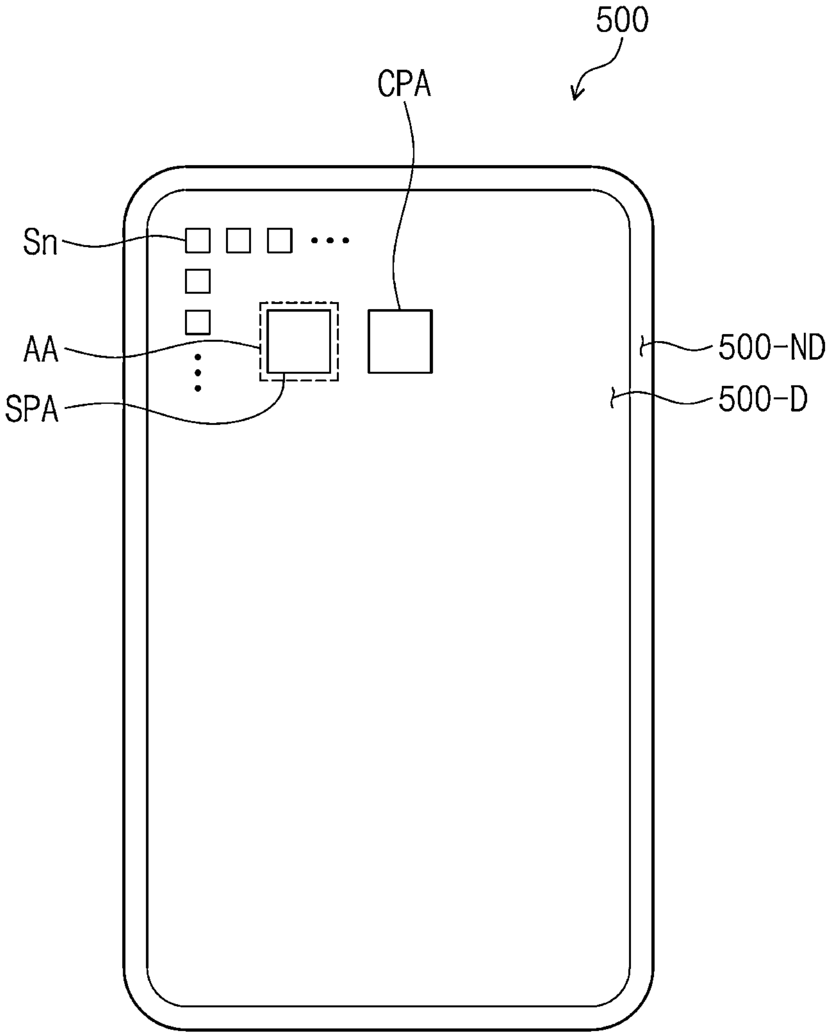
FIG. 2A is a plan view of an embodiment of an inspection target according to the disclosure.
Figure 2B:
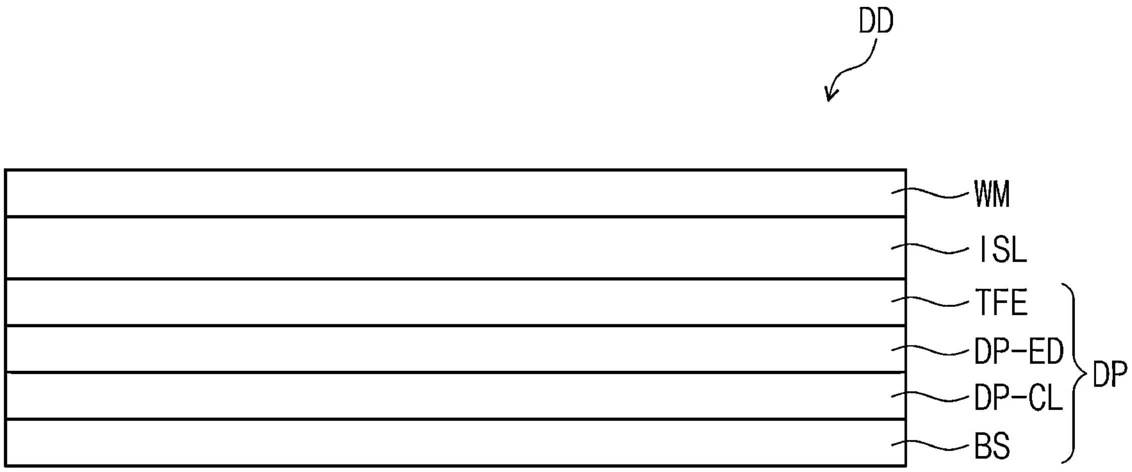
FIG. 2B is a cross-sectional view of an embodiment of a display device according to the disclosure.
Figure 2C:
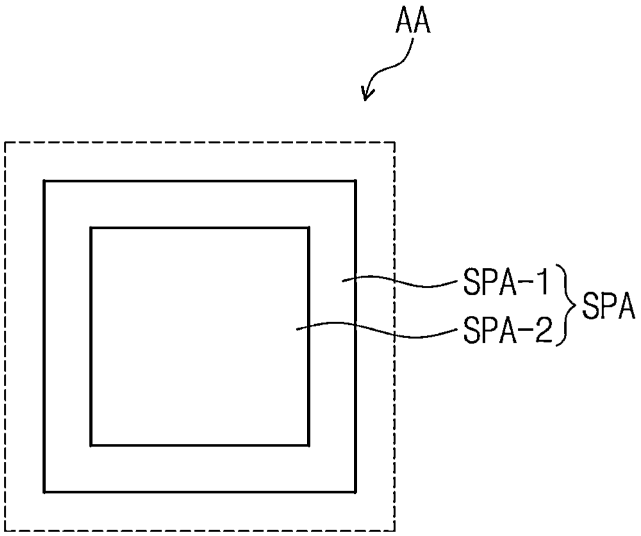
FIG. 2C is an enlarged view of an area AA shown in FIG. 2A.

FIG. 1 is a block diagram of an embodiment of an inspection device 1000 according to the disclosure. FIG. 2A is a plan view of an embodiment of an inspection target 500 according to the disclosure. FIG. 2B is a cross-sectional view of an embodiment of a display device DD according to the disclosure. FIG. 2C is an enlarged view of an area AA shown in FIG. 2A.

Referring to FIG. 1, the inspection device 1000 may include an imaging unit 100, a data extraction unit 200, a setting unit 300, and an inspection unit 400. The inspection device 1000 may be one of various types of inspection devices to detect whether the inspection target 500 is defective.

A light source LA may provide a light Lt to the inspection target 500. The light Lt may be irradiated to an optical member OM. The light Lt provided to the optical member OM may travel to an inspection target 500 after passing through the optical member OM. In detail, the optical member OM may be placed at a position to allow a path of the light Lt to direct to the inspection target 500. The light Lt may have a visible light wavelength, however, it should not be limited thereto or thereby. In an embodiment, the light Lt may have an ultraviolet light wavelength.

The inspection target 500 may be disposed on a stage ST. Referring to FIG. 2A, the inspection target 500 may include a plurality of cells Sn. In an embodiment, the inspection target 500 may include a display panel that is still in the process of manufacturing, e.g., a preliminary display panel, however, it should not be limited thereto or thereby. In an embodiment, the inspection target 500 may include a display panel, may include a display panel and an input sensing layer, or may include a display panel, an input sensing layer, and a window.

The inspection target 500 may include a first area 500-D and a second area 500-ND. The first area 500-D may correspond to a display area of the display device DD (refer to FIG. 2B), and the second area 500-ND may correspond to a non-display area of the display device DD. Accordingly, when the manufacturing process of the display device DD is completed, an image may be displayed through the first area 500-D.

The cells Sn (or pixels) may be arranged in the first area 500-D, and each of the cells Sn (or pixels) may include sub-pixels. The sub-pixels may include a red sub-pixel, a blue sub-pixel, and a green sub-pixel, for example, however, this is merely an illustrative embodiment. In an embodiment, the color of sub-pixels constituting one pixel may be changed in various ways.

The inspection target 500 may include an inspection area SPA and a comparative area CPA. The inspection area SPA may be an area that is inspected to determine whether the inspection target 500 is defective. Although not shown in drawing figures, the inspection area SPA may be provided in plural in the first area 500-D. In this case, the plural inspection areas SPA may be inspected at the same time in a defect detection process described later.

The comparative area CPA may be an area similar to the inspection area SPA and may be defined adjacent to the inspection area SPA. The comparative area CPA may be defined as an area from which comparative data CPD used to compare the inspection area SPA with the comparative area CPA are extracted to determine whether the inspection target 500 is defective. A process of selecting the comparative area CPA may include selecting several candidate areas from the inspection area SPA and selecting the area most similar to the inspection area SPA, however, the disclosure should not be limited thereto or thereby. In an embodiment, the comparative data CPD may be selected based on data stored in the inspection device 1000.

Referring to FIG. 2B, the display device DD may be a device that is activated in response to electrical signals. The display device DD may be included in various electronic devices. In an embodiment, the display device DD may be applied to a large-sized electronic item, such as a television set, a monitor, or an outdoor billboard, and a small and medium-sized electronic item, such as a personal computer, a notebook computer, a personal digital assistant, a car navigation unit, a game unit, a mobile electronic device, or a camera, for example. However, these are merely illustrative embodiments, and the display device DD may be applied to other electronic items as long as they do not depart from the inventive concept of the disclosure.

The display device DD may include a plurality of layers. In detail, the display device DD may include a display panel DP, an input sensing layer ISL, and a window WM. The display panel DP may include a base layer BS, a circuit layer DP-CL, a display element layer DP-ED, and an encapsulation layer TFE.

The inspection target 500 may include some of components of the display device DD. In an embodiment, the inspection target 500 may be the display device DD, or the inspection target 500 may include only the display panel DP. In an embodiment, the inspection target 500 may be a preliminary display panel before being formed into the display panel DP. The preliminary display panel may be in a state in which the circuit layer DP-CL is completely formed or only a portion of the circuit layer DP-CL is formed.

In an embodiment of the disclosure, in a process of obtaining image data IMD from the inspection target 500, the image data IMD may be data generated by imaging the same layer of the inspection target 500. When the inspection area SPA and the comparative area CPA are in different layers, a grayscale value of the comparative area CPA may differ greatly compared with a case when the inspection area SPA and the comparative area CPA are in the same layer. As it is difficult to conduct accurately the inspection by difference of the grayscale value, the inspection area SPA and the comparative area CPA may be in the same layer.

In an embodiment, the imaging unit 100 may be placed on a path of a light RLt reflected by the inspection target 500. The imaging unit 100 may capture the inspection target 500 and may output the image data IMD corresponding to the inspection target 500. In detail, the imaging unit 100 may generate the image data IMD from the light RLt reflected by the inspection target 500 and may output the image data IMD to the data extraction unit 200. The image data IMD may be white light or fluorescent light captured images.

In an embodiment, the data extraction unit 200 may receive the image data IMD and may extract inspection data SPD and comparative data CPD from the image data IMD. Referring to FIGS. 1 and 2A, the inspection data SPD may be generated corresponding to the inspection area SPA, and the comparative data CPD may be generated corresponding to the comparative area CPA, however, the disclosure should not be limited thereto or thereby. In an embodiment, the data extraction unit 200 may extract only the inspection data SPD from the image data IMD and the inspection device 1000 (refer to FIG. 1) includes a separate data storage unit which stores the data obtained from the inspection target with no defects as the comparative data CPD and provides the comparative data CPD to the setting unit 300 and the inspection unit 400.

The data extraction unit 200 may provide the comparative data CPD to the setting unit 300 and may provide the inspection data SPD and the comparative data CPD to the inspection unit 400. The data extraction unit 200 may be an arithmetic processing unit. In an embodiment, the data extraction unit 200 may be a graphics processing unit.

The setting unit 300 may receive the comparative data CPD and may set a threshold value Th based on the grayscale value of the comparative data CPD. The set threshold value Th may be provided to the inspection unit 400. The threshold value Th may be a reference value according to a difference in grayscale value between the inspection data SPD and the comparative data CPD and may be used as a reference value to determine whether the inspection target 500 is defective. In an embodiment, the setting unit 300 may set the threshold value Th to allow the threshold value Th to increase as the grayscale value of the comparative data CPD increases, however, it should not be limited thereto or thereby. The setting of the threshold value Th by the setting unit 300 will be described in detail later.

The inspection unit 400 may receive the inspection data SPD and the comparative data CPD from the data extraction unit 200 and may receive the threshold value Th from the setting unit 300. The inspection unit 400 may compare the inspection data SPD with the comparative data CPD and may determine whether the inspection target 500 is defective based on the threshold value Th. In detail, when a value corresponding to the difference between the grayscale value of the inspection data SPD and the grayscale value of the comparative data CPD is greater than the threshold value Th, the inspection unit 400 may determine that the inspection target 500 is defective, and when the value corresponding to the difference between the grayscale value of the inspection data SPD and the grayscale value of the comparative data CPD is equal to or smaller than the threshold value Th, the inspection unit 400 may determine that the inspection target 500 is normal. These processes are performed sequentially, so that all parts of the inspection target 500 may be inspected for defects. However, the disclosure should not be limited thereto or thereby. In an embodiment, the inspection data SPD may be obtained from a plurality of inspection areas SPA of the inspection target 500. The inspection unit 400 may set the inspection data SPD to be inspected from the inspection data SPD and may compare the inspection data SPD with the comparative data CPD based on the threshold value Th to determine whether the inspection target 500 is defective.

Referring to FIGS. 1 and 2C, the inspection area SPA may include a first inspection area SPA-1 and a second inspection area SPA-2. The first inspection area SPA-1 may correspond to a region of interest for inspection. As shown in drawing figures, the first inspection area SPA-1 may be spaced apart from an outermost portion of the inspection area SPA and may have a quadrangular shape. The second inspection area SPA-2 may correspond to an area except the first inspection area SPA-1 in the inspection area SPA. However, the disclosure should not be limited thereto or thereby. In an embodiment, the first inspection area SPA-1 may have a variety of shapes rather than the quadrangular shape, and the inspection area SPA may be divided into left and right portions or upper and lower portions rather than being divided into inside and outside portions as shown in FIG. 2C.

In an embodiment, the data extraction unit 200 may generate first inspection data SPD-1 corresponding to the first inspection area SPA-1 and second inspection data SPD-2 corresponding to the second inspection area SPA-2 and may provide the first inspection data SPD-1 and the second inspection data SPD-2 to the inspection unit 400. The inspection unit 400 may determine whether the first and second inspection areas SPA-1 and SPA-2 are defective based on the threshold value Th set from the first inspection data SPD-1 and the second inspection data SPD-2.

In detail, the setting unit 300 may provide the threshold value Th set from the second inspection data SPD-2 to the inspection unit 400, and the inspection unit 400 may determine whether the first inspection area SPA-1 is defective based on the threshold value Th set from the second inspection data SPD-2. The setting unit 300 may provide the threshold value Th set from the first inspection data SPD-1 to the inspection unit 400, and the inspection unit 400 may determine whether the second inspection area SPA-2 is defective based on the threshold value Th set from the first inspection data SPD-1. However, the disclosure should not be limited thereto or thereby. In an embodiment, the setting unit 300 may provide the threshold value Th set from the second inspection data SPD-2 to the inspection unit 400 to determine whether the first inspection area SPA-1 is defective, however, the inspection unit 400 may determine whether the second inspection area SPA-2 is defective based on a predetermined threshold value Th.

Figure 3:
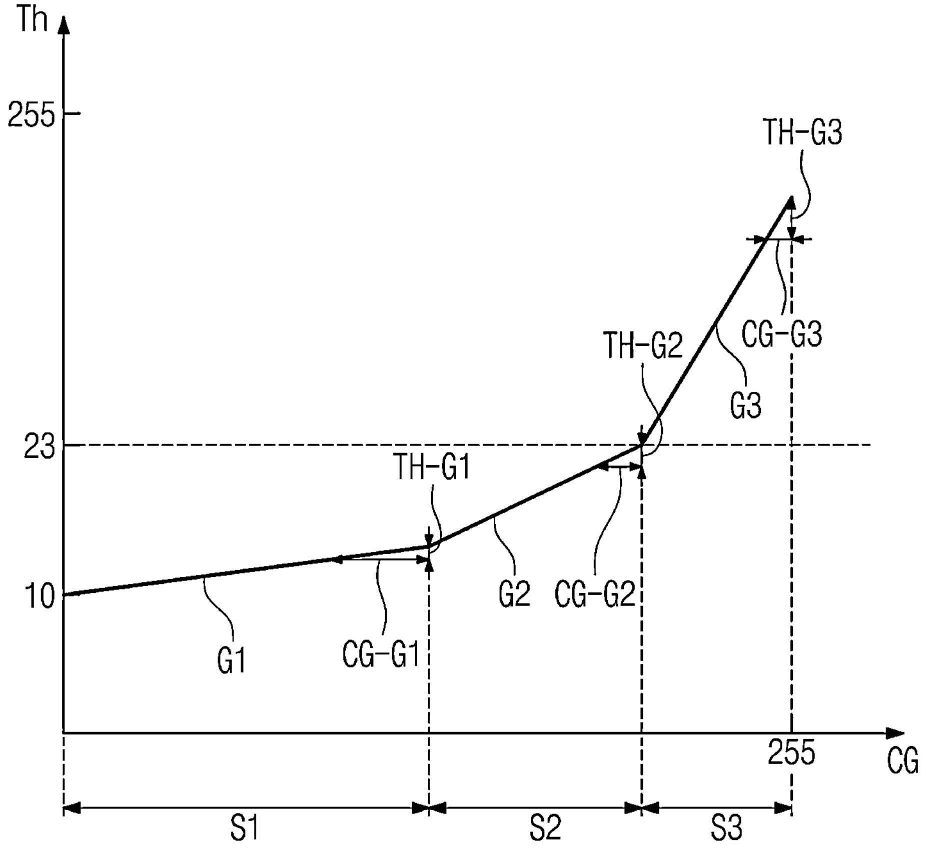
FIG. 3 is a graph of an embodiment of a variation of a threshold value as a function of a grayscale value of comparative data according to the disclosure.
Figure 4A:
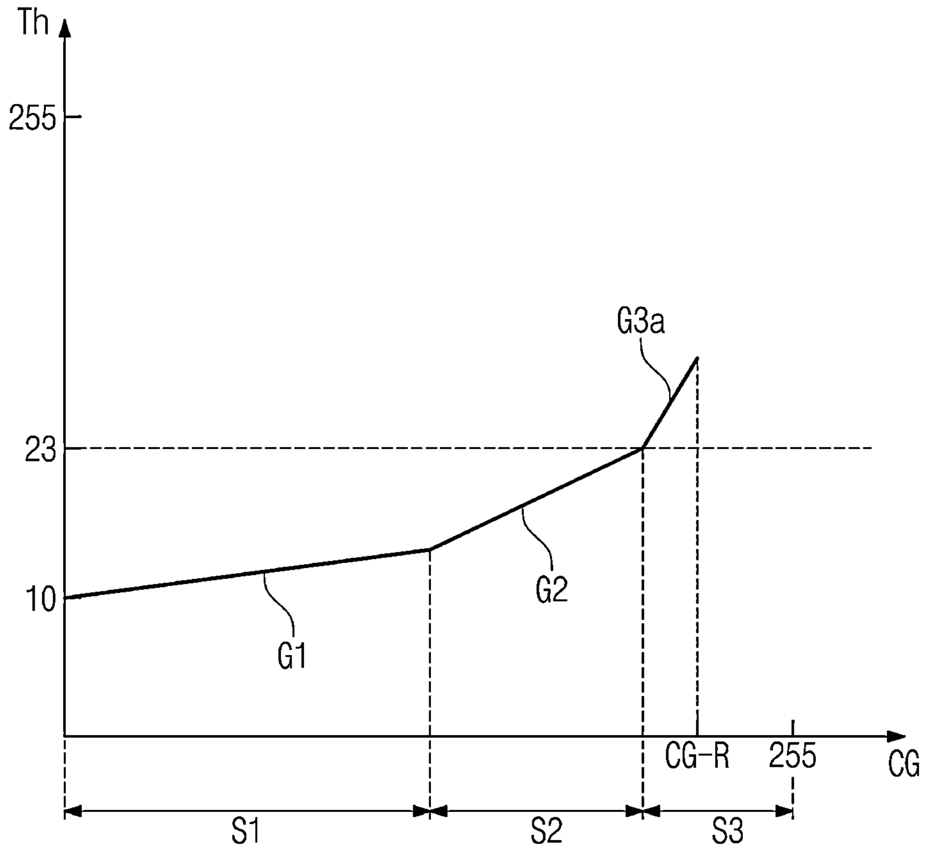
FIG. 4A is a graph of an embodiment of a variation of a threshold value as a function of a grayscale value of comparative data according to the disclosure.
Figure 4B:
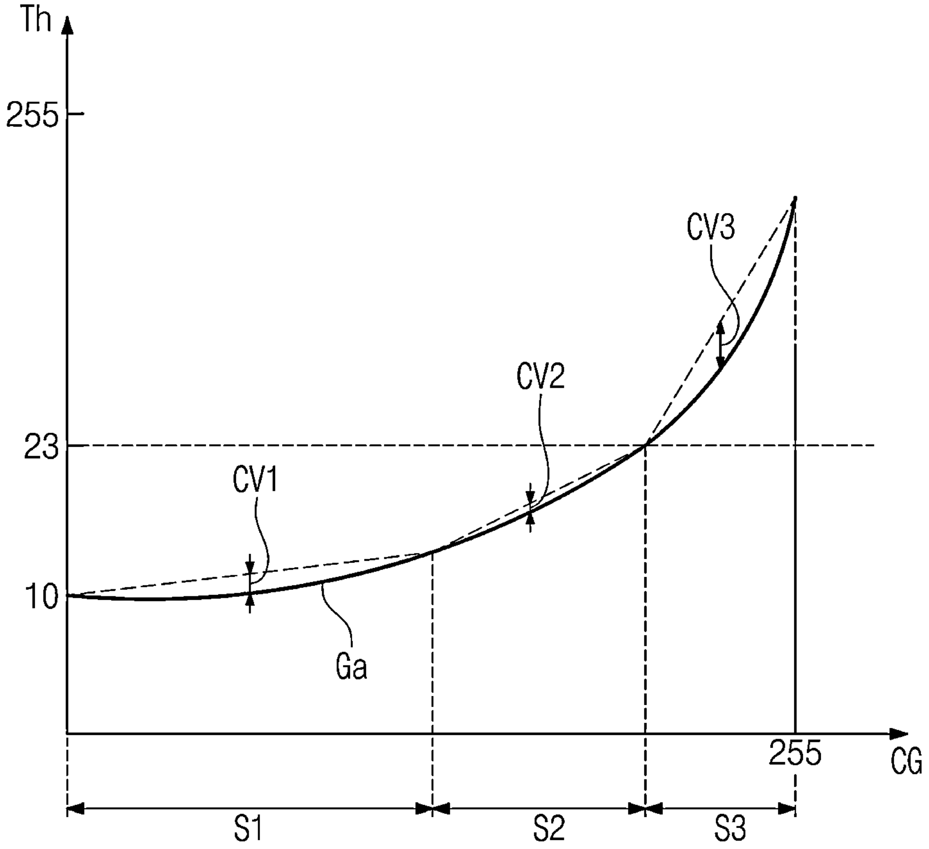
FIG. 4B is a graph of an embodiment of a variation of a threshold value as a function of a grayscale value of comparative data according to the disclosure.

FIGS. 3, 4A, and 4B are graphs of an embodiment of a variation of a threshold value as a function of a grayscale value of comparative data according to the disclosure.

In FIGS. 3, 4A, and 4B, an x-axis shows a comparative grayscale value CG of the comparative data CPD extracted from the comparative area CPA, and a y-axis shows a threshold value Th set based on the comparative grayscale value CG by the setting unit 300.

Referring to FIG. 3, the comparative grayscale value CG may have a range from 0 to 255. The comparative grayscale value CG may be classified into a first section S1, a second section S2, and a third section S3, however, it should not be particularly limited. In an embodiment, the comparative grayscale value CG may be classified into two sections or four or more sections.

In an embodiment, the first section S1 may be wider than the second section S2, and the second section S2 may be wider than the third section S3, however, the disclosure should not be limited thereto or thereby. Each of first section S1, the second section S2, and the third section S3 may be changed in various ways.

In an embodiment, the setting unit 300 may set an increase amount of the comparative grayscale value CG to be directly proportional to an increase amount of the threshold value Th in each of the first section S1, the second section S2, and the third section S3. In detail, a relationship between a first grayscale value increase amount CG-G1 of the comparative data CPD and a first threshold value increase amount Th-G1 in the first section S1 may be defined as a first proportional value PV1, a relationship between a second grayscale value increase amount CG-G2 of the comparative data CPD and a second threshold value increase amount Th-G2 in the second section S2 may be defined as a second proportional value PV2, and a relationship between a third grayscale value increase amount CG-G3 of the comparative data CPD and a third threshold value increase amount Th-G3 in the third section S3 may be also referred to as a third proportional value PV3.

The third proportional value PV3 may be set greater than the second proportional value PV2 by the setting unit 300, and the second proportional value PV2 may be set greater than the first proportional value PV1 by the setting unit 300, however, the disclosure should not be limited thereto or thereby. In an embodiment, the third proportional value PV3 may be set equal to the second proportional value PV2, and the second proportional value PV2 may be set equal to the first proportional value PV1.

In an embodiment, the setting unit 300 may set the comparative grayscale value CG and the threshold value Th such that the increase amount of the comparative grayscale value CG and the increase amount of the threshold value Th have a linear relationship in each of the first section S1, the second section S2, and the third section S3. In detail, the comparative grayscale value CG and the threshold value Th may have a first linear relationship in the first section S1, may have a second linear relationship in the second section S2, and may have a third linear relationship in the third section S3.

In FIG. 3, the first, second, and third linear relationships are represented by a first linear graph G1, a second linear graph G2, and a third linear graph G3, respectively. The first linear graph G1 of the first section S1 may correspond to the first linear relationship, the second linear graph G2 of the second section S2 may correspond to the second linear relationship, and the third linear graph G3 of the third section S3 may correspond to the third linear relationship.

A slope of the first linear relationship may correspond to the first proportional value PV1, a slope of the second linear relationship may correspond to the second proportional value PV2, and a slope of the third linear relationship may correspond to the third proportional value PV3. Accordingly, the slope of the third linear relationship may be greater than the slope of the second linear relationship, and the slope of the second linear relationship may be greater than the slope of the first linear relationship. That is, the slope of the third linear graph G3 may be greater than the slope of the second linear graph G2, and the slope of the second linear graph G2 may be greater than the slope of the first linear graph G1. However, the disclosure should not be limited thereto or thereby. In an embodiment, the slope of the third linear graph G3 may be the same as the slope of the second linear graph G2, and the slope of the second linear graph G2 may be the same as the slope of the first linear graph G1.

The threshold value Th shown by the y-axis may correspond to the reference value according to the grayscale value of the comparative data CPD and may be used as a reference to determine whether the inspection target 500 is defective. The threshold value Th may be selected from a range from 0 to 255.

According to a comparative example, the threshold value Th used to determine whether the inspection target 500 is defective may be fixed to a predetermined value, e.g., 23. Accordingly, even though positions of inspection areas are different in the inspection target 500 or the grayscale values of the comparative data CPD from inspection areas are different, the defects of the inspection areas are determined based on the same threshold value Th. In this case, an intrinsic defect may not be detected, or an extrinsic defect may be detected as the intrinsic defect, and thus, a reliability of the inspection may be deteriorated.

According to the disclosure, the threshold value Th may be changed depending on positions of the inspection areas in the inspection target 500 or the grayscale value of the comparative data CPD. In an embodiment, the intrinsic defect that may be missed in the comparative example may be detected by setting the threshold value Th at a relatively low level in the section where the comparative grayscale value CG of the comparative area CPA is relatively low, and the extrinsic defect that may be mis-determined as the intrinsic defect in the comparative example may not be mis-determined as the intrinsic defect by setting the threshold value Th at a relatively high level in the section where the comparative grayscale value CG of the comparative area CPA is high. The threshold voltage Th may be set as three linear graphs according to the comparative grayscale value CG of the comparative area CPA. As a result, the reliability of the defect determination by the inspection device may be improved, and a yield of products inspected by the inspection device may be improved. In addition, in a case where the region of interest for inspection is inspected, the threshold value Th may increase or decrease according to characteristics of the region of interest for inspection.

Referring to FIG. 4A, the range of the comparative grayscale value CG of the comparative data CPD may include a first section S1, a second section S2, and a third section S3, and a reference grayscale value CG-R may be defined in the third section S3. As shown in FIG. 4A, the reference grayscale value CG-R may be set in the third section S3, however, in an embodiment, the reference grayscale value CG-R may be set in the second section S2, or the reference grayscale value CG-R may not be defined.

In an embodiment, the inspection unit 400 may not determine whether the inspection target 500 is defective in a section where the comparative grayscale value CG is greater than the reference grayscale value CG-R. In detail, the setting unit 300 may set the threshold value Th in response to the comparative grayscale value CG of the comparative area CPA, however, the threshold value Th may not be set in the section where the comparative grayscale value CG is greater than the reference grayscale value CG-R of the third section S3 in which the reference grayscale value CG-R is set. Then, since the threshold value Th is not set in the section where the comparative grayscale value CG is greater than the reference grayscale value CG-R, the inspection unit 400 that does not receive the threshold value Th may not determine whether the inspection target 500 is defective, however, the disclosure should not be limited thereto or thereby. In an embodiment, the threshold value Th may be set to infinity (∞) or 255 in the section where the comparative grayscale value CG is greater than the reference grayscale value CG-R. Then, since the threshold value Th is infinity (∞), a value corresponding to the difference between the grayscale value of the inspection data SPD and the comparative grayscale value CG of the comparative data CPD is smaller than the threshold value Th, and thus, the inspection unit 400 may determine that the inspection target 500 is normal.

In an embodiment, the setting unit 300 may set the comparative grayscale value CG such that the increase amount of the comparative grayscale value CG of the comparative data CPD and the increase amount of the threshold value Th may have the linear relationship in each of the first section S1, the second section S2, and the third section S3. In detail, the increase amount of the comparative grayscale value CG and the increase amount of the threshold value Th may have the first linear relationship in the first section S1, may have the second linear relationship in the second section S2, and may have the third linear relationship in the third section S3.

In an embodiment, the linear relationship may be represented by a linear graph. The comparative grayscale value CG and the threshold value Th may have a first linear graph G1 in the first section S1, a second linear graph G2 in the second section S2, and a third linear graph G3*a* in the third section S3 corresponding to, respectively, the first linear relationship, the second linear relationship, and the third linear relationship. When compared with the graph of FIG. 3, the third linear graph G3*a* is omitted in the section where the comparative grayscale value CG is greater than the reference grayscale value CG-R, however, the disclosure should not be limited thereto or thereby. In an embodiment, the threshold value Th may be set to 255, which is the maximum value of the threshold value Th, in the section where the comparative grayscale value CG is greater than the reference grayscale value CG-R.

As the reference grayscale value CG-R is set and whether the inspection target 500 is defective is not determined in the section where the comparative grayscale value CG is greater than the reference grayscale value CG-R, it is possible to prevent errors of determining non-defective products as defective in the section where the comparative grayscale value CG of the comparative area CPA is high. As a result, the reliability in determining the defects of the inspection device may be improved, and the yield of the products inspected by the inspection device may be improved.

Referring to FIG. 4B, the range of the comparative grayscale value CG of the comparative data CPD may include a first section S1, a second section S2, and a third section S3, and when compared with the graph shown in FIG. 3, the graph to which a first correction value CV1, a second correction value CV2, and a third correction value CV3 are applied in the first section S1, the second section S2 and the third section S3, respectively, is shown. In detail, the setting unit 300 may set a threshold value Th to which the first correction value CV1 is applied in the first section S1, may set a threshold value Th to which the second correction value CV2 is applied in the second section S2, and may set a threshold value Th to which the third correction value CV3 is applied in the third section S3. As shown in FIG. 4B, the first correction value CV1, the second correction value CV2, and the third correction value CV3 may be set to a negative value, and thus, the threshold value Th is set relatively low compared with the graph shown in FIG. 3, however, the disclosure should not be limited thereto or thereby. In an embodiment, each of the first correction value CV1, the second correction value CV2, and the third correction value CV3 may be set to a positive value, or only the third correction value CV3 may be set to a positive value. The inspection target 500 may be changed to another inspection target, and different correction values may be applied to for each inspection target 500. Accordingly, the reliability in determining the defects of the inspection device may be improved, and the yield of the products inspected by the inspection device may be improved.

Figure 5A:
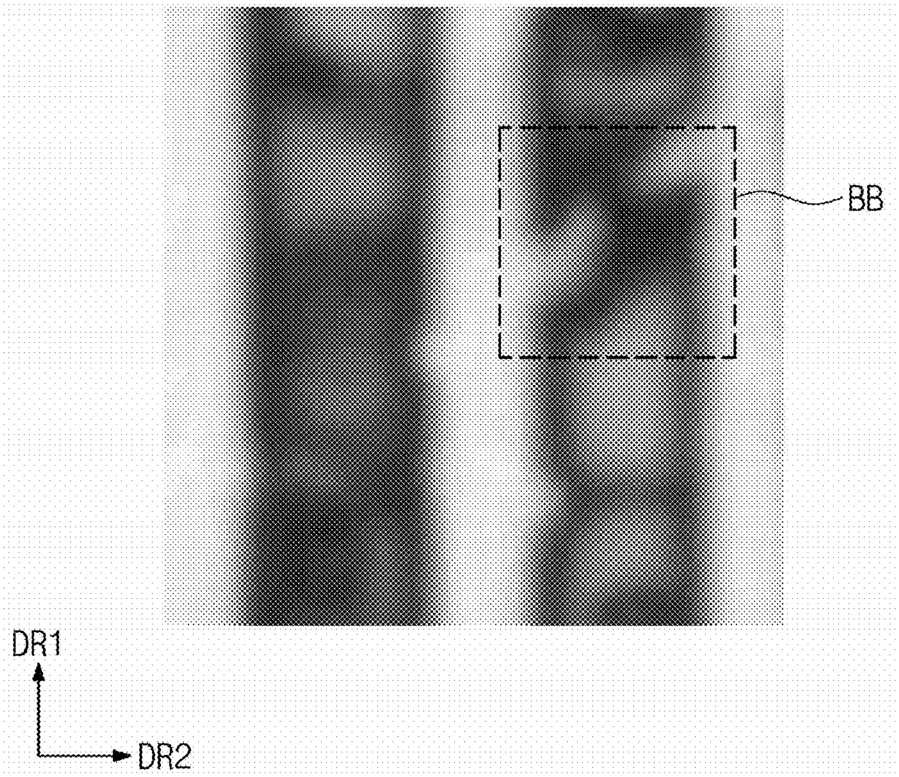
FIG. 5A is an image of inspection data according to the disclosure.
Figure 5B:
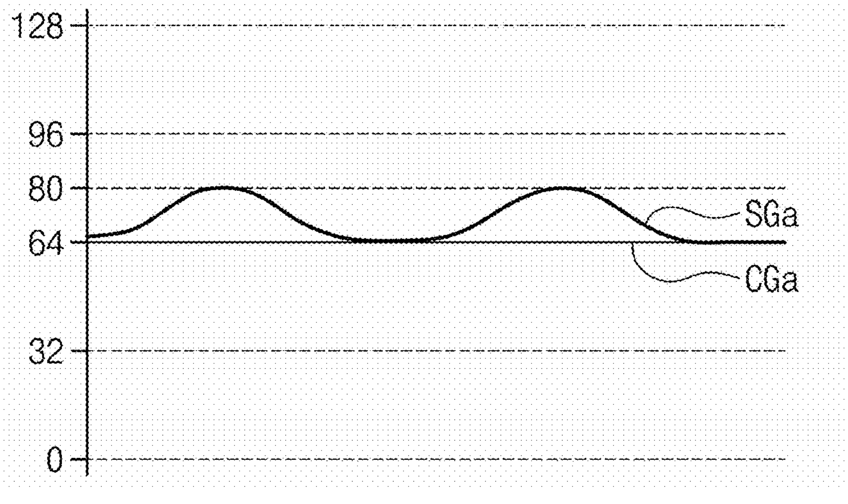
FIG. 5B is a graph of an embodiment of inspection data corresponding to an area BB of FIG. 5A.

FIG. 5A is an image of an embodiment of inspection data according to the disclosure, and FIG. 5B is a graph of inspection data corresponding to an area BB of FIG. 5A.

Referring to FIGS. 1 and 5A, the imaging unit 100 may generate the image data IMD from the light RLt reflected by the inspection target 500 and may output the image data IMD to the data extraction unit 200. The image shown in FIG. 5A may correspond to the image data IMD. The data extraction unit 200 may receive the image data IMD and may extract the inspection data SPD from the image data IMD.

In FIG. 5A, a bright portion indicates wires, and a bright area detected in a dark portion indicates a defect caused by a foreign substance. In detail, it is observed that the defect is generated by the foreign substance from the wires in the area with a relatively low grayscale value as in the area BB.

FIG. 5B shows a graph of an inspection grayscale value SGa of inspection data SPD (refer to FIG. 1) along a second direction DR2 with respect to the area BB.

A comparative grayscale value CGa may be 64, and the inspection grayscale value SGa may be within a range from 64 to 80. A maximum difference between the inspection grayscale value SGa and the comparative grayscale value CGa may be 16. According to a comparative example, since the threshold value is fixed to 23, the difference between the inspection grayscale value SGa and the comparative grayscale value CGa may not be greater than the threshold value. Accordingly, the error that the intrinsic defect is not determined as the defect may occur. However, according to the disclosure, the threshold value Th may be lowered to about 12 by taking into account the comparative grayscale value CGa. Accordingly, the difference between the inspection grayscale value SGa and the comparative grayscale value CGa may be greater than the threshold value Th, and thus, the intrinsic defect may be detected as the intrinsic defect. As a result, the reliability in determining the defects of the inspection device may be improved, and the yield of the products inspected by the inspection device may be improved.

Figure 6A:
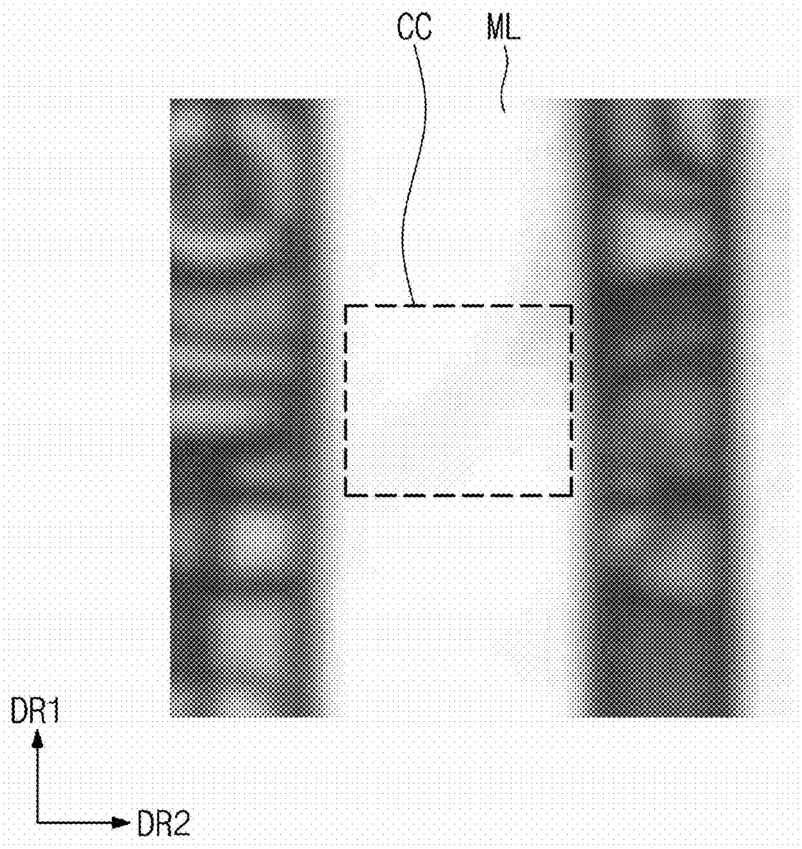
FIG. 6A is an image of an embodiment of inspection data according to the disclosure.
Figure 6B:
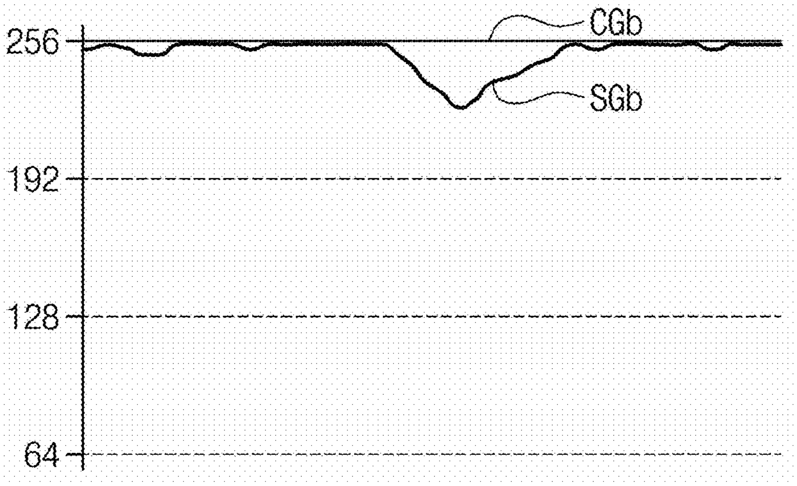
FIG. 6B is a graph of inspection data corresponding to an area CC of FIG. 6A.

FIG. 6A is an image of an embodiment of inspection data according to the disclosure, and FIG. 6B is a graph of inspection data corresponding to an area CC of FIG. 6A.

Referring to FIG. 6A, a bright portion indicates a metal layer ML, and a dark area is detected in the bright portion even though the dark area is not a defect caused by a foreign substance. In detail, even though the defect caused by the foreign substance does not occur in an area with a relatively high grayscale value as the area CC, the image corresponding to the area with a relatively high grayscale value may partially have a different grayscale value due to other factors.

FIG. 6B shows a graph of an inspection grayscale value SGb of the inspection data SPD (refer to FIG. 1) along the second direction DR2 with respect to the area CC.

A comparative grayscale value CGb may be 256, and the inspection grayscale value SGb may be within a range from 224 to 256. A maximum difference between the inspection grayscale value SGb and the comparative grayscale value CGb may be 32. According to the comparative example, since the threshold value is fixed to 23, the difference between the inspection grayscale value SGb and the comparative grayscale value CGb may be greater than the threshold value. Accordingly, the error that the extrinsic defect of the normal products is determined as the defect may occur. However, according to the disclosure, the threshold value Th may be equal to or greater than about 200 by taking into account the comparative grayscale value CGb. Accordingly, the difference between the inspection grayscale value SGb and the comparative grayscale value CGb is smaller than the threshold value Th, and thus, the extrinsic defect may be prevented from being detected as the defect. As a result, the reliability in determining the defects of the inspection device may be improved, and the yield of the products inspected by the inspection device may be improved.

Figure 7:
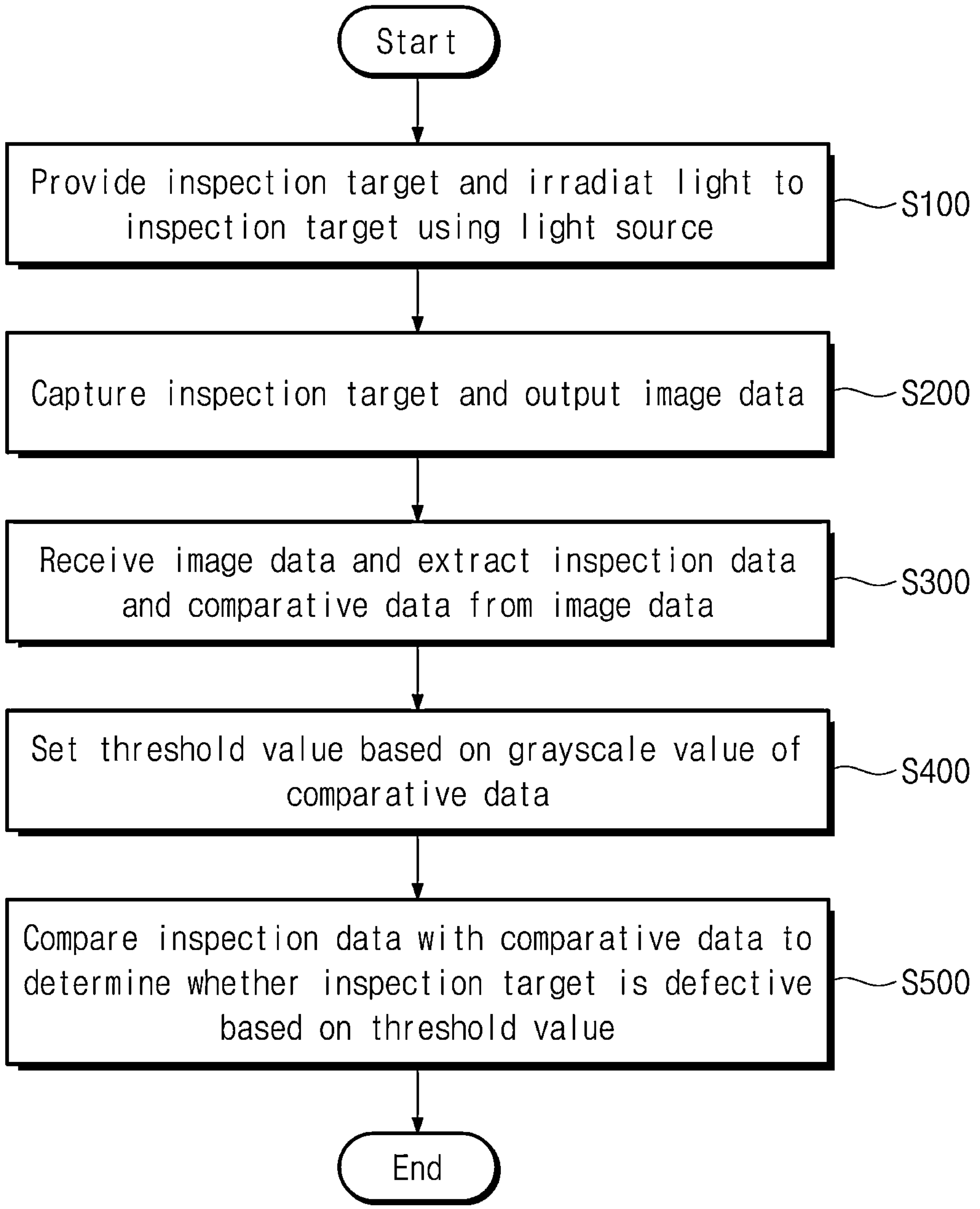
FIGS. 7 to 9 are flowcharts of an embodiment of an inspection method according to the disclosure.
Figure 8:
Figure 9:
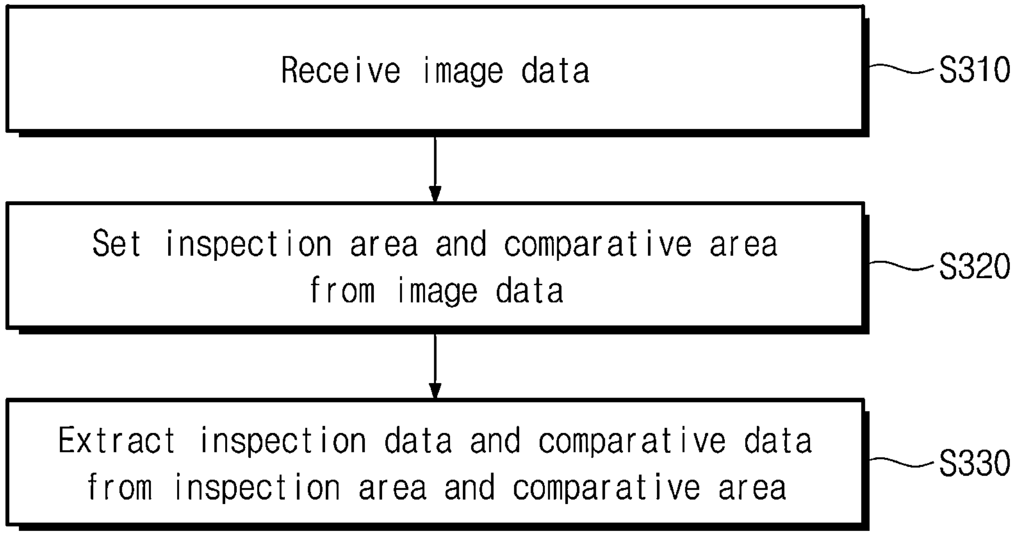

FIGS. 7 to 9 are flowcharts of an embodiment of an inspection method according to the disclosure.

Referring to FIGS. 1 and 7, the inspection target 500 may be disposed above the stage ST, and the light source LA may irradiate the light Lt to the inspection target 500 (S100). Referring to FIG. 8, the irradiating of the light Lt to the inspection target 500 by the light source LA may include controlling the path of the light Lt toward the inspection target 500 using the optical member OM (S110), however, the disclosure should not be limited thereto or thereby. In an embodiment, the optical member OM may be omitted, and the light source LA may be disposed under the inspection target 500 and may directly irradiate the light Lt to the inspection target 500.

Referring to FIGS. 1, 6A, and 7, the imaging unit 100 may be disposed on the path of the light RLt reflected by the inspection target 500. The imaging unit 100 may capture the inspection target 500 and may output the image data IMD (S200). The image data IMD may be obtained from the inspection target 500. Although not shown in drawing figures, the outputting of the image data IMD by the imaging unit 100 (S200) may include capturing the metal layer ML of the inspection target 500 and outputting the image data IMD. Referring to FIG. 2A, the inspection target 500 may include the display device DD including the cells Sn. Referring to FIG. 2B, the display device DD may have a multi-layer structure including the metal layer.

In an embodiment, the display panel DP may include the metal layer. In an embodiment, the input sensing layer ISL may also include the metal layer. Accordingly, the outputting of the image data IMD by the imaging unit 100 (S200) may be performed by capturing the metal layer included in the display panel DP or the input sensing layer ISL and outputting the image data IMD.

The data extraction unit 200 may receive the image data IMD and may extract the inspection data SPD and the comparative data CPD from the image data IMD (S300), however, the disclosure should not be limited thereto or thereby. In an embodiment, the data extraction unit 200 may extract only the inspection data SPD from the image data IMD and the inspection device 1000 (refer to FIG. 1) includes a separate data storage unit which stores the data obtained from the inspection target with no defects as the comparative data CPD and provides the comparative data CPD to the setting unit 300 and the inspection unit 400.

Referring to FIG. 9, the receiving of the image data IMD and the extracting of the inspection data SPD and the comparative data CPD (S300) may include receiving the image data IMD (S310), setting the inspection area SPA and the comparative area CPA from the image data IMD (S320), and extracting the inspection data SPD and the comparative data CPD from the inspection area SPA and the comparative area CPA (S330). Although not shown in drawing figures, the extracting of the inspection data SPD and the comparative data CPD may include setting one inspection area SPA and the comparative area CPA, however the disclosure should not be limited thereto or thereby. In an embodiment, the extracting of the inspection data SPD and the comparative data CPD may include selecting a plurality of areas and setting the inspection area SPA that is the inspection target among the areas and the comparative area CPA.

The setting unit 300 may set the threshold value Th based on the grayscale value of the comparative data CPD (S400). In an embodiment, the setting unit 300 may set the threshold value Th to allow the threshold value Th to increase as the grayscale value of the comparative data CPD increases. Referring to FIG. 3, the increase amounts CG-G1, CG-G2, and CG-G3 of the grayscale value of the comparative data CPD and the increase amounts TH-G1, TH-G2, and TH-G3 of the threshold value Th may have the linear relationship. Particularly, the increase amounts CG-G1, CG-G2, and CG-G3 of the grayscale value of the comparative data CPD and the increase amounts TH-G1, TH-G2, and TH-G3 of the threshold value Th may have the first linear relationship in the first section S1, may have the second linear relationship in the second section S2, and may have the third linear relationship in the third section S3. The grayscale value of the comparative data CPD and the threshold value Th may be represented by the linear graph. The linear graph may have the first linear graph G1 in the first section S1, the second linear graph G2 in the second section S2, and the third linear graph G3 in the third section S3 respectively corresponding to the first linear relationship, the second linear relationship, and the third linear relationship.

The inspection unit 400 may compare the inspection data SPD with the comparative data CPD and may determine whether the inspection target 500 is defective based on the threshold value Th (S500). In detail, the inspection unit 400 may compare the inspection data SPD with the comparative data CPD, which are provided from the data extraction unit 200, based on the threshold value Th provided from the setting unit 300 to determine whether the inspection target 500 is defective. Although not shown in drawing figures, the inspection unit 400 may determine that the inspection target 500 is defective when the value corresponding to the difference between the grayscale value of the inspection data SPD and the grayscale value of the comparative data CPD is greater than the threshold value Th and may determine that the inspection target 500 is normal when the value corresponding to the difference between the grayscale value of the inspection data SPD and the grayscale value of the comparative data CPD is equal to or smaller than the threshold value Th.

Although the embodiments of the disclosure have been described, it is understood that the disclosure should not be limited to these embodiments but various changes and modifications may be made by one ordinary skilled in the art within the spirit and scope of the disclosure as hereinafter claimed.

Therefore, the disclosed subject matter should not be limited to any single embodiment described herein, and the scope of the inventive concept shall be determined according to the attached claims.

What is claimed is:

1. An inspection device for inspecting an inspection target, the inspection device comprising:

an imaging circuit which captures the inspection target and outputs image data corresponding to the inspection target;

a data extraction circuit which receives the image data and extracts inspection data corresponding to an inspection area of the inspection target from the image data;

a setting circuit which sets a threshold value based on a grayscale value of comparative data compared with the inspection data in a manner in which the threshold value increases as the grayscale value of the comparative data increases and the threshold value decreases as the grayscale value of the comparative data decreases; and an inspection circuit which determines that the inspection target is defective in a state in which a difference between the inspection data and the comparative data exceeds the threshold value, wherein the grayscale value range of the comparative data is classified into a plurality of sections, wherein the threshold value has a linear relationship with the grayscale value of the comparative data in each of the plurality of sections, and wherein a slope in a section corresponding to higher grayscale value is greater than a slope in a section corresponding to lower grayscale value.

2. The inspection device of claim 1, wherein the plurality of sections comprise a first section, a second section, and a third section, and the grayscale value of the comparative data has a range comprising the first section, the second section, and the third section.

3. The inspection device of claim 2, wherein the setting circuit sets the grayscale value of the comparative data and the threshold value such that an increase amount of the grayscale value of the comparative data is directly proportional to an increase amount of the threshold value in each of the first section, the second section, and the third section.

4. The inspection device of claim 3, wherein a relationship between the increase amount of the grayscale value of the comparative data and the increase amount of the threshold value in the first section is defined as a first proportional value, a relationship between the increase amount of the grayscale value of the comparative data and the increase amount of the threshold value in the second section is defined as a second proportional value, a relationship between the increase amount of the grayscale value of the comparative data and the increase amount of the threshold value in the third section is defined as a third proportional value, the third proportional value is set greater than the second proportional value by the setting circuit, and the second proportional value is set greater than the first proportional value by the setting circuit.

5. The inspection device of claim 3, wherein the setting circuit sets the threshold value to which a first correction value is applied in the first section, sets the threshold value to which a second correction value is applied in the second section, and sets the threshold value to which a third correction value is applied in the third section.

6. The inspection device of claim 1, wherein a reference grayscale value is defined in a range of the grayscale value of the comparative data, and the inspection circuit does not determine whether the inspection target is defective in a section where the grayscale value is greater than the reference grayscale value.

7. The inspection device of claim 1, wherein the inspection area comprises a first inspection area and a second inspection area, the data extraction circuit extracts first inspection data corresponding to the first inspection area and second inspection data corresponding to the second inspection area, and the inspection circuit determines whether the first and second inspection data are defective based on different threshold values from each other.

8. The inspection device of claim 1, wherein the comparative data correspond to a comparative area from the image data to be compared with the inspection area.

9. The inspection device of claim 1, wherein the inspection target comprises a plurality of cells.

10. The inspection device of claim 8, wherein the inspection target comprises a plurality of layers, and the inspection area and the comparative area are defined in a same layer.

11. The inspection device of claim 1, further comprising:

a light source which irradiates a light; and an optical member which controls a path of the light to direct toward the inspection target.

* * * * *